F. T. ROBERTS.
TUBE FOR PNEUMATIC TIRES.
APPLICATION FILED JULY 5, 1916.
1,310,438.
Patented July 22, 1919.
2 SHEETS—SHEET 1.
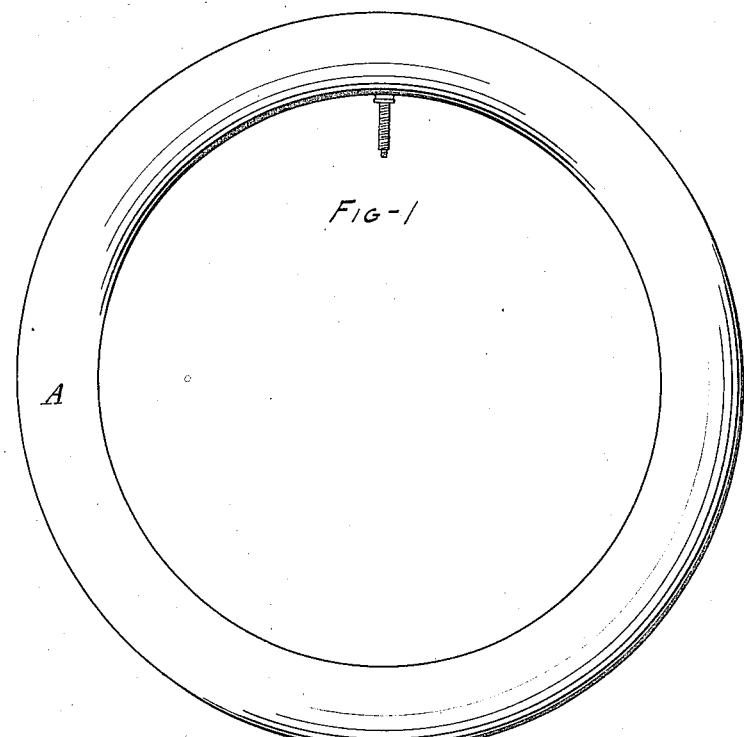
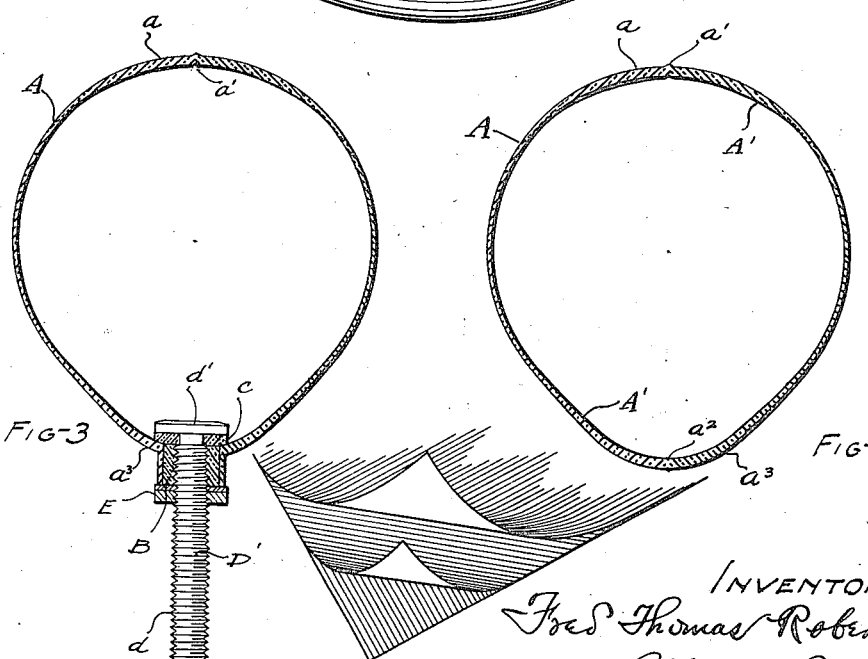
INVENTOR
Fred Thomas Roberts,
By Albert H. Baker,
ATTY F. T. ROBERTS.
TUBE FOR PNEUMATIC TIRES.
APPLICATION FILED JULY 5, 1916.
1,310,438.
Patented July 22, 1919.
2 SHEETS—SHEET 2.
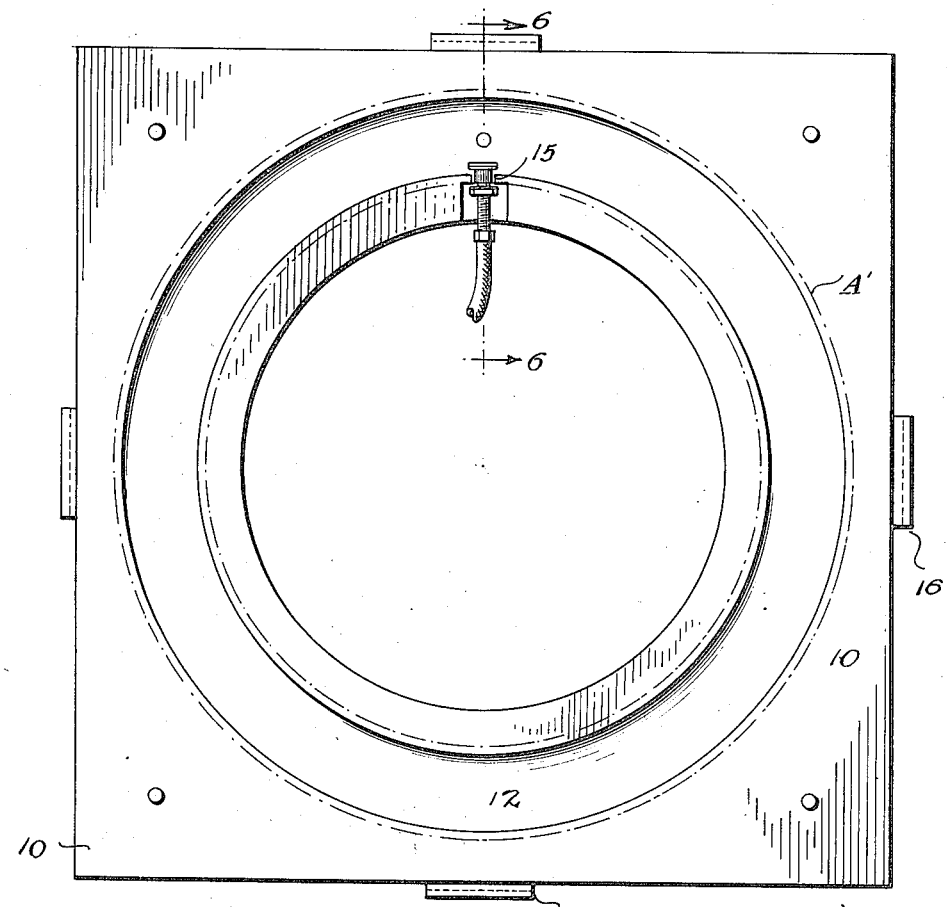
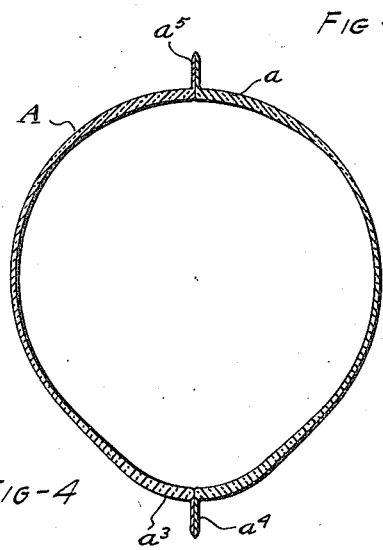
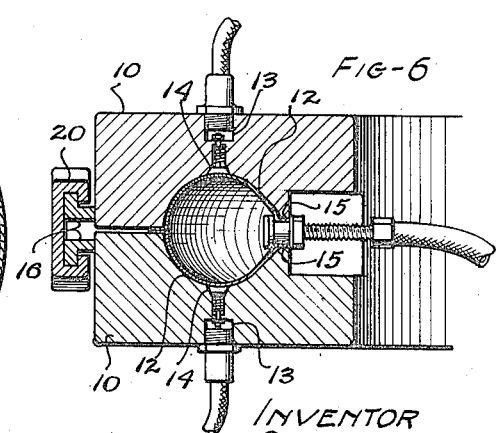

UNITED STATES PATENT OFFICE.

FRED THOMAS ROBERTS, OF CLEVELAND, OHIO.

TUBE FOR PNEUMATIC TIRES.

1,310,438.  Specification of Letters Patent.  Patented July 22, 1919.

Application filed July 5, 1916. Serial No. 107,491.

*To all whom it may concern:*

Be it known that I, FRED THOMAS ROBERTS, a citizen of the United States, residing at Cleveland, in the county of Cuyahoga and State of Ohio, have invented a certain new and useful Improvement in Tubes for Pneumatic Tires, of which the following is a full, clear, and exact description, reference being had to the accompanying drawings.

A related application of mine, filed July 5, 1916, and numbered 107,489 shows, describes and claims a process of making inner tubes for pneumatic tires. Briefly, that process comprises placing two sheets of raw rubber stock across the mouths of annular mold cavities, bringing the mold members together upon an interposed nipple, and vulcanizing the two sections of the tube to each other and to the interposed nipple, the tube being caused to snugly seat against the walls of the mold either by a vacuum applied to the cavities or fluid under pressure within the tube, or both. The article made by such process has many advantages independent of the cheapness, simplicity and efficiency of the method of manufacture, a number of which advantages will be hereinafter mentioned. The present application relates to this article, however manufactured.

The drawings clearly disclose a tube embodying the present invention, and also illustrate briefly the method of manufacturing such tubes. In these drawings Figure 1 is a side elevation of a complete tube; Fig. 2 is a cross section thereof; Fig. 3 is a cross section adjacent to the inflating nipple. These three views represent the finished article. Fig. 4 is a cross section of the tube as it comes from the vulcanizing mold and before the flanges have been removed; Fig. 5 is a plan of either of two mold members which may be employed in making the tube, the annular rubber stock being indicated by broken lines; Fig. 6 is a cross section of two of such mold members in coacting position, the rubber tube being shown in cross section seated in these members; Fig. 7 is a view illustrating a laminated rubber sheet which may be employed, if desired, in making the tube.

As shown in Figs. 1, 2 and 3, A indicates the annular tube responding to the present invention. This tube is a complete vulcanized annulus without cemented joints of any kind. Its only seams are vulcanized seams, and thus are as strong as the rest of the article. The tube is made of two annular sheets of rubber A' A', which are joined at their inner and outer peripheries, and thus there is a very slight, hardly perceptible line of juncture, indicated at $a^1$ and $a^2$ in the drawings. This tube is considerably thicker at the tread $a$ (where there is the greatest liability to wear and puncture) than at the sides.

The pneumatic forcing of the raw rubber stock into the mold cavities, in the preferred method of manufacture, itself causes an increased thickness at the tread, since the greatest stretching of the rubber occurs adjacent to the middle of the annular sheet, without much stretching adjacent to the edges, and there thus is a thickening of the molded tube halves adjacent to the edges. The tread may be further thickened if desired, by employing original stock which is thicker adjacent to the outer periphery than at the inner. If the tube is manufactured from flat rubber stock, there is also a thickening adjacent to the inner periphery, as shown at $a^3$ in Figs. 2 and 3. This thickening at the inner periphery, while not so useful as the thickening at the tread, is advantageous in effecting a tight hold on the nipple and in rendering the tube less liable to be damaged by accident from the tools used in putting the tire casing on the wheel rim.

It will be seen from inspection of Figs. 2 and 3 that my tube is somewhat pear-shaped in cross section, so that it has substantially the shape of the cavity within a tire casing. This has a number of advantages, hereinafter pointed out.

The nipple through which the tube is inflated is shown in position in the tire in Fig. 3. The nipple is indicated at D'; it has the usual screw thread $d$ on its exterior and a head $d^1$ within the tube. Surrounding the nipple and bearing against the head is a rubber washer C, and outside of this and around the body of the nipple is a rubber sleeve B. The body of the tire tube lies outside of the washer and extends around and in contact with the rubber sleeve, and is clamped tightly against this washer and sleeve by a nut E, screwing onto the threads of the exterior of the nipple, a thin washer being placed between the nut and the rubber.

Among the advantages of the tube, such as above described, I will first note the prevention of leakage at joints. The usual inner tube on the market is made of a sheet rolled up into a straight tube which is then vulcanized, and the ends then overlapped and cemented together. This cemented joint, made after vulcanization, is a constant source of weakness in the tube and very frequently results in leakage and sometimes in blow-outs at that place. By vulcanizing the two sections of my tire together I do away entirely with any cemented joint, and thus obviate this troublesome leakage.

Another place where leakage frequently results in the usual tube is at the nipple. It has been customary to cement a patch on the vulcanized tube, make a hole through this patch and the wall of the tube, push the nipple through the hole and clamp it by a nut on the outside. Now such connection, being all done after the tube is vulcanized, very frequently leaks and occasionally the nipple pulls out of the tube. With my construction the leakage is entirely prevented at this point. The rubber sleeve on the nipple combining with the flange of the rubber tube makes a very tight connection with plenty of rubber, and the vulcanizing of the parts secures this rubber tightly to the nipple, and the external nut prevents any displacement of this connection.

Another great advantage of my tube consists in the thickened tread above referred to. This very materially increases the wear of the tube and reduces the liability to puncture.

Another advantage of my tube is that it is made to the actual shape of the casing cavity and nearly to the size thereof, so that there is very little stretching of the tube in use. Stretching of the rubber necessarily increases the size of the pores therein. In an ordinary tube this stretching is a very material factor in adapting the tube for the space provided for it, and thus increases the size of the pores, causing leakage. Moreover, the stretched rubber is more liable to puncture. Another advantage of having the tube of the actual shape of the tire cavity is that there is less liability of its being damaged adjacent to the inner periphery by the tools which are used for prying the casing onto the rim or the rim within the casing.

If desired, my tube readily adapts itself to manufacture from laminated stock made by pressing several calendered sheets on each other with the grain in different directions. Such a tube possesses additional strength and freedom from tear. Laminated stock, for this purpose, is illustrated in Fig. 7, which shows three superimposed rubber sheets with their grain extending in different directions.

Another advantage of my tube is that it adapts itself to a great saving of material in its manufacture over the ordinary tube; for, the ordinary tube being made straight, and then connected into annular form, there must necessarily be considerable excess of rubber on the inner side of the annulus in order that there be sufficient rubber on the outer side. There is also a waste of material where one end of the tube overlaps on the other. My tube does not need this waste. The sheets of rubber stock need be only slightly larger than the material which passes into the mold cavities, and the edge flanges can be mostly removed before vulcanization takes place so that only a small flange at the edges is vulcanized and removed.

Briefly, therefore, my tube is economical to manufacture; it reduces the leakage by avoiding the overlapped cemented joint of the tube, by vulcanizing the filling nipple in place, and by preventing the stretching of the ports; it increases the resistance to puncture by providing a thicker tread, by substantially obviating the internal tension in the tread, and by the inherent strength of the tube, and it is not liable to injury while being put in place.

As above stated, the process which I prefer to employ in making this tube is that described and claimed in my application referred to, and reference may be made to that application for fuller information. Brief illustrations of mechanism which may be employed are given in Figs. 5 and 6. As there shown, 10, 10 are a pair of mold members, each of which consists of a ring-like plate having in it an annular cavity 12. 13 indicates venting openings leading from these cavities, and 14 valves or plugs in these openings. 15 indicates radial channels extending inwardly from the edge of the mold cavities at one point and adapted to accommodate the valve nipple. 16 indicates hooked wedge-shaped ribs on the sides of the mold members which are adapted to be embraced by a wedge-shaped hooking clamp 20.

In operation, two annular raw rubber sheets are placed across the mouths of the mold cavities 12, and the two mold members are brought together upon the interposed nipple D, which has been previously provided with the washer C and sleeve B, shown in Fig. 3. The mold members are clamped together by the clamp 20, and the nipple is drawn firmly to place by the nut E screwing up against the edge of the mold, as shown in Fig. 6. The two annular rubber sheets are caused to seat firmly against the walls of the mold cavities. This may be accomplished before the mold members are brought together by a vacuum applied to the openings 13, or it may be accomplished after the mold members are brought together by compressed air pumped in through the valve nipple or both means may be employed, as more fully explained in my other application.

With the rubber of the tube firmly against the walls of the mold members, and these members tightly clamped together and the nipple clamped in place, and the venting openings closed by the plugs or valves, the vulcanization is effected, after which the mold is opened and the tube removed. When removed it presents substantially the form shown in Fig. 4. Then it is only necessary to trim off the projecting flanges $a^4$ and $a^5$ and to tighten up the nut E on the valve stem, against the rubber of the sleeve B and of the tube itself, and the article is complete.

Having thus described my invention, what I claim is:

1. As a new article of manufacture, a soft rubber annular inner tube for a pneumatic tire, composed of a plurality of contiguous sheets of rubber with the grain extending in different directions.

2. An inner tube for pneumatic tires consisting of two trough-shaped annular members each comprising a half of the tube and each consisting of a plurality of superimposed sheets having their grain lying in different directions, said members being intimately united at the inner and outer periphery of the tube.

3. An inner tube for pneumatic tires comprising an annular tubular body, a valve nipple having a head, a rubber washer surrounding the shank of the nipple and lying against the head, the washer and head being within the tube, a sleeve surrounding the shank of the nipple, the material of the tube being flanged about the sleeve, the washer, sleeve and adjacent body of the tube being all vulcanized together.

4. An inner tube for pneumatic tires comprising an annular tubular body, a valve nipple having a head, a rubber washer surrounding the shank of the nipple and lying against the head, the washer and head being within the tube, a sleeve surrounding the shank of the nipple, the material of the tube being flanged about the sleeve, and a nut screwing onto the nipple and compacting the sleeve and the adjacent material of the tube against said washer and head.

5. A tube for tires, comprising a body made of two endless annular pieces united only by seams at the inner and outer periphery, a valve nipple extending within the tubular body, and a rubber sleeve surrounding the nipple, the material of each sheet of the tube being flanged outwardly to embrace said rubber.

In testimony whereof, I hereunto affix my signature.

FRED THOMAS ROBERTS.